United States Patent [19]

Tanaka et al.

[11] Patent Number: 4,713,691

[45] Date of Patent: Dec. 15, 1987

[54] INTERFACE CIRCUIT OF VIDEO SIGNAL HARD COPY APPARATUS

[75] Inventors: Fumihiro Tanaka; Yoshio Shimada; Kaneo Yamaguchi; Kenichi Matsushima; Shinya Watanabe, all of Tokyo, Japan

[73] Assignee: Seiko Instruments & Electronics Ltd., Tokyo, Japan

[21] Appl. No.: 912,946

[22] Filed: Sep. 29, 1986

[30] Foreign Application Priority Data

Oct. 1, 1985 [JP] Japan ............................ 60-150232[U]

[51] Int. Cl.$^4$ ........................ H04N 5/04; H04N 1/36
[52] U.S. Cl. .................................... 358/148; 358/158; 358/264; 340/814; 455/118
[58] Field of Search ............... 358/148, 150, 152, 158, 358/264, 319, 320, 325, 337; 340/814; 455/111, 118, 119, 120

[56] References Cited

U.S. PATENT DOCUMENTS

| | | | |
|---|---|---|---|
| 3,637,936 | 1/1972 | Krause | 358/325 |
| 4,203,075 | 5/1980 | Wessler | 358/264 |
| 4,631,600 | 12/1986 | Fukui | 358/320 |

*Primary Examiner*—James J. Groody
*Assistant Examiner*—Michael D. Parker
*Attorney, Agent, or Firm*—Bruce L. Adams; Van C. Wilks

[57] ABSTRACT

An interface circuit of video signal hard copy apparatus for optimizing a phase of a sampling clock to an image signal. A delayed signal of a video sync signal is employed for a reference input signal of a sampling clock generation circuit. The delay quantity of the video sync signal is arbitrarily set by a control circuit. The delay quantity corresponding to the point of change of sampled data is detected by a CPU circuit according to the sequential comparison with some of the sampled data of an image signal in the plural delay quantities. A stable sampling can be attained even for a high frequency video signal exceeding 100 MHz by setting the optimum delay quantity according to the detected delay quantity.

1 Claim, 6 Drawing Figures

INTERFACE CIRCUIT OF VIDEO SIGNAL HARD COPY APPARATUS

BACKGROUND OF THE INVENTION

1. Field of the Invention

This invention relates to a printing apparatus which receives a video signal as input data and prints and records an image, and more particularly to a sampling circuit of the video signal.

2. Description of the Prior Art

As accuracy, density and resolution of image display devices in the recent CAD CAM applications have made a progress, it has now become necessary for hard copy apparatuses, too, to reproduce the displayed image with a high level of fidelity. In order to particularly effect high fidelity recording of graphic display, sampling of an image signal by a sampling clock on the 1:1 basis must be made.

Some display devices having low resolution supply a sync clock signal corresponding to a pixel signal together with a display video signal, and sampling of an image signal by this clock signal has been made in the past.

When display devices do not have such a sync clock signal, there has been employed conventionally a clock signal generator which has some multiples of frequency of the sync clock signal described above and a frequency division circuit and synchronizes the phase of the frequency division circuit by a video sync signal.

In latest high resolution display devices described above, however, the video signal frequency is as high as above 100 MHz and hardly any of them supply the sync clock signal. In a system which uses a frequency division circuit, too, there is a limit to circuit elements which operate at several hundreds of mega-Hertz and such a circuit cannot be accomplished easily. In such a high speed video signal, variance of the delay quantities of the circuit elements used frequently causes variance of phase between the video sync signal and the image signal. In color display devices, phases mostly vary among R, G and B signals.

SUMMARY OF THE INVENTION

It is therefore an object of this invention to provide an interface circuit for high frequency video signals.

In order to solve the problems described above, the interface circuit of the present invention comprises a video sync signal delay circuit using a delay element, a sampling clock generation circuit consisting of a PLL circuit which is in synchronism with the output of the delay circuit, a circuit which samples an image signal by this clock, a memory circuit which stores the sampled image data and a circuit which reads the data of the memory circuit and sets the delay quantity of the delay circuit, in order to adjust the phase of the sampling clock to the image signal to the optimum level.

In the construction described above, the sampled data are repeatedly read and compared with one another whenever the delay quantity is changed so that the change of the sampled data can be detected. In addition, the image data can be sampled stably by setting this changing delay quantity at a point where the delay quantity is deviated by a half period of the sampling clock or at an intermediate point of a plurality of changing points.

DETAILED DESCRIPTION OF THE PREFERED EMBODIMENTS

Hereinafter, one embodiment of the present invention will be described in detail with reference to the accompanying drawings.

Figure 1:
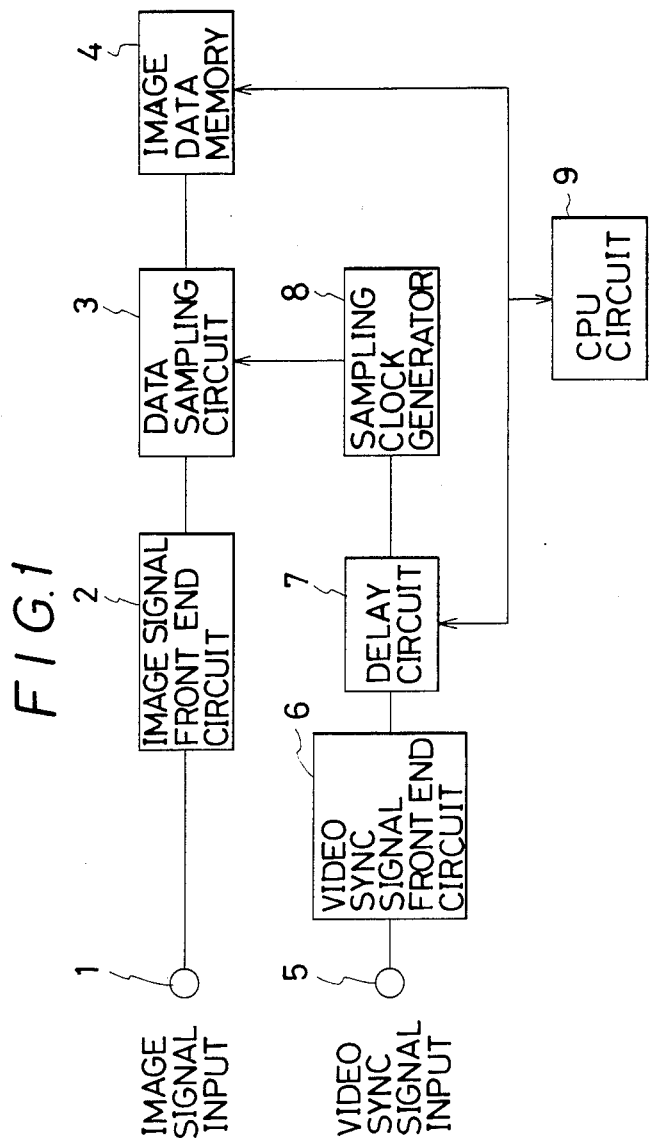
FIG. 1 is a block diagram useful for explaining an embodiment of the present invention.

In FIG. 1, an image signal front end circuit 2 is one that converts an image signal inputted thereto from an image signal input terminal 1 to a logic level and consists of a signal buffer circuit, a comparator circuit, or the like. The image signal which is converted to the logic level by the front end circuit 2 is sampled at a data sampling circuit 3 by a clock signal from a sampling clock generation circuit 8 and is stored in an image data memory 4.

On the other hand, a video sync signal is applied to a video sync signal input terminal 5, and is converted to a logic level by a video sync signal front end circuit 6 in the same way as the image signal. A suitable delay time is applied to the video sync signal by a delay circuit 7 consisting of delay elements having a plurality of delay outputs such as delay line and a signal selection circuit, and is then inputted to a sampling clock generation circuit 8.

The sampling clock generation circuit 8 described above is a PLL circuit consisting of a quartz oscillation circuit, a phase comparator and a phase correction circuit, compares the phase of the video sync signal with that of the clock signal and outputs a clock having always a constant phase with respect to the video sync signal. It generates a sampling clock having always a constant phase with respect to the image signal, too, by use of a oscillation element which has the same frequency as the video signal clock frequency. Reference numeral 9 represents a CPU circuit, which controls the start of sampling of the sampling circuit 3, read of the image data from the image data memory 4 and setting of the delay quantity of the delay circuit 7.

Next, the phase adjustment procedure of the sampling clock with respect to the image signal in the circuit construction described above will now be explained.

Figure 2:
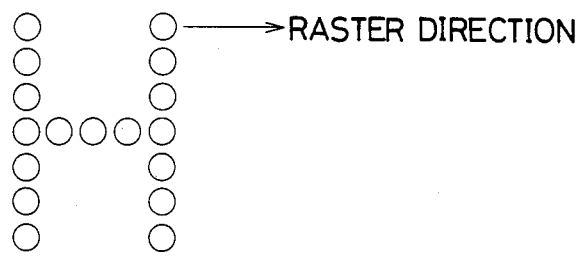
FIG. 2 is a display image view for executing adjustment.
Figure 3:
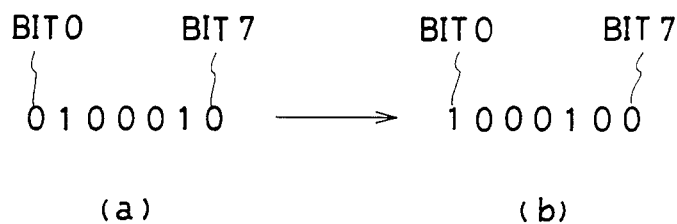
FIG. 3 is a view showing the state of data inside an image data memory.

First of all, an image is displayed on the display device. Here, it will be assumed that an alphabet H shown in FIG. 2 is displayed. Since the delay quantity of the delay circuit must be changed sequentially, the delay quantity is first set to the minimum level and sampling of the image data is conducted. The image data sampled above is recorded to the image data memory 4. Then, CPU 9 searches the image data memory 4 in the same way as raster scanning of the video signal, whereby the data corresponding to the upper end of the image can be found out at the address corresponding to the portion where the image is displayed, as shown in FIG. 3(a).

Next, the delay quantity is increased by one step and sampling is made. The data thus sampled is compared with the state of the previous data. These procedures are repeated, and the bit position of the data becomes deviated at any of the delay quantities as shown in FIG. 3(b).

Figure 4:
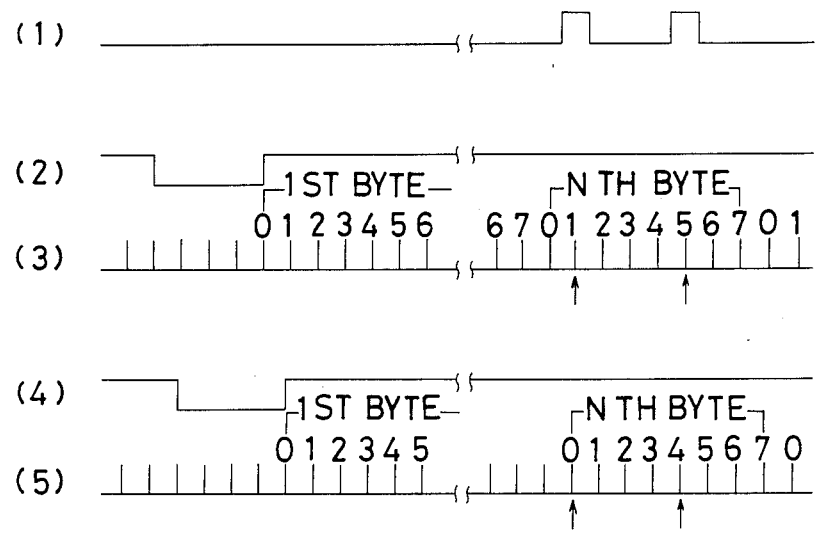
FIG. 4 is a timing chart showing the state of sampling.
Figure 5:
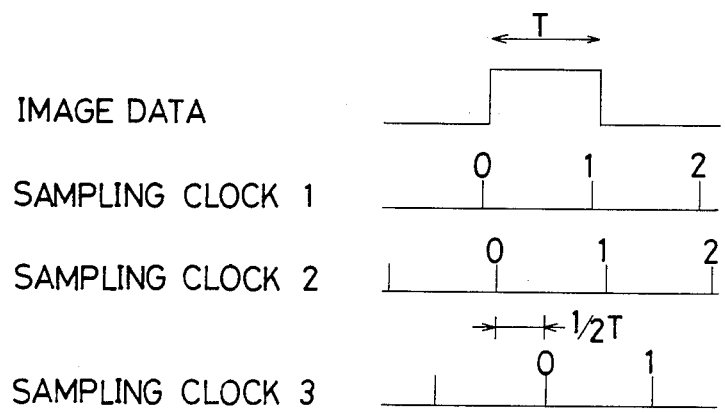
FIG. 5 is a timing chart between an image signal and a sampling clock.

The operation described above will be explained with reference to the timing chart of FIG. 4. In the timing chart, (1) represents the image signal; (2) is the sync signal when the delay quantity is minimum; (3) is the sampling clock generated by the sync signal of (2); (4) is a sync signal when a certain delay quantity is set; and (5) is a sampling clock generated by (4). When the data shown in FIG. 2 is sampled when setting the minimum delay quantity, the data of the logic "1" is sampled by the bit 1 and bit 5 of the Nth byte from the rear end of the sync signal as shown in FIG. 3(a). In the case of the sampling clock generated by the sync signal (4) which is delayed, sampling is made by the bit 0 and bit 4 of the Nth byte as shown in FIG. 3(b). When the image data is sampled, it is preferred that sampling is made at the center of the image data signal as shown in FIG. 4 (3), but it is difficult to directly judge whether or not sampling is made at the center. Therefore, the delay quantity is sequentially changed to determine a point where the state of sampling changes as represented by the sampling clock 1 and the sampling clock 2 shown in FIG. 5. Since this point represents that sampling is made under the unstable state, sampling can be made while keeping a stable phase such as the sampling clock 3 by setting a delay quantity which is deviated by the ½ period of the sampling clock from the delay quantity of this unstable point.

Figure 6:
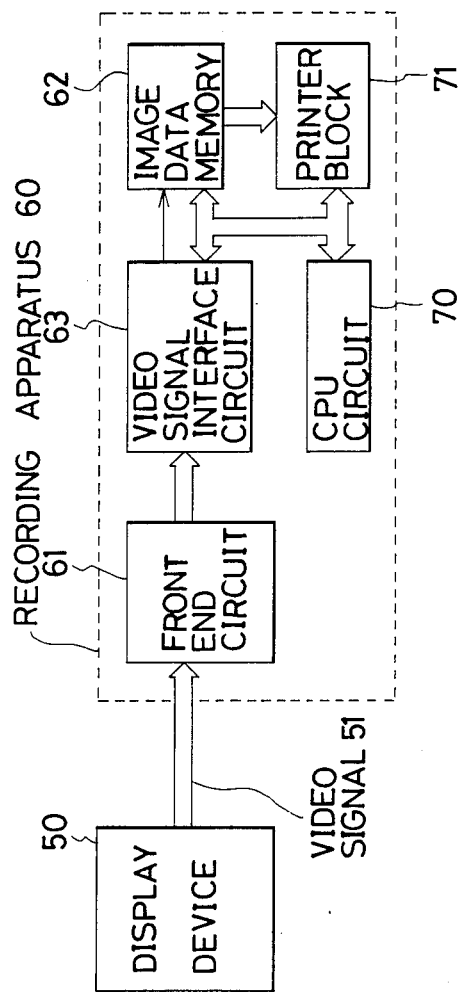
FIG. 6 is a block diagram including a display device and a recoding apparatus.

The above mentioned video signal interface circuit in accordance with this invention is included in a recording apparatus as shown in FIG. 6.

As can be understood from the description given above, the present device can stably sample video signals having all the phase relation, and adjustment can be made easily under control of CPU. Furthermore, the interface circuit of the present device can be connected to a plurality of display devices by use of a simple multiplexer by adjusting individually the display devices and storing the delay quantity for each display device in a non-volatile memory or the like.

What is claimed is:

1. In a recording apparatus (60) for receiving a video signal (51) for displaying image data on a display device (50) and printing and recording said image data, an interface circuit of a video signal hard copy apparatus comprising:
    (a) a delay circuit (7) which sets arbitrarily a delay quantity of a sync signal;
    (b) a sampling clock generation circuit (8) which has a predetermined phase relation with a video sync signal through said delay circuit (7);
    (c) a data sampling circuit (3) which samples an image signal by said sampling clock;
    (d) an image data memory circuit (4) which stores the output of said sampling circuit; and
    (e) a control circuit (9) which receives the data of said memory circuit (4) and sets the delay quantity of said delay circuit (7);

whereby a plurality of data samples for said delay quantity are compared in order to set the delay quantity.

* * * * *